(12) United States Patent
Ye

(10) Patent No.: US 11,075,941 B2
(45) Date of Patent: Jul. 27, 2021

(54) RISK CONTROL METHOD, RISK CONTROL APPARATUS, ELECTRONIC DEVICE, AND STORAGE MEDIUM

(71) Applicant: Advanced New Technologies Co., Ltd., Grand Cayman (KY)

(72) Inventor: Fanfan Ye, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/083,946

(22) Filed: Oct. 29, 2020

(65) Prior Publication Data
US 2021/0044614 A1    Feb. 11, 2021

Related U.S. Application Data

(63) Continuation of application No. PCT/CN2019/090737, filed on Jun. 11, 2019.

(30) Foreign Application Priority Data

Jul. 11, 2018  (CN) .......................... 201810755331.4

(51) Int. Cl.
*H04L 29/06*         (2006.01)
(52) U.S. Cl.
CPC ........ *H04L 63/1433* (2013.01); *H04L 63/104* (2013.01); *H04L 63/1425* (2013.01)
(58) Field of Classification Search
CPC .............. H04L 63/1433; H04L 63/104; H04L 63/1425; G06F 21/577
See application file for complete search history.

(56) References Cited

U.S. PATENT DOCUMENTS 9,338,181 B1 *  5/2016  Burns ................. H04L 63/1416
9,798,883 B1 * 10/2017  Gil ......................... G06F 21/577
(Continued)

FOREIGN PATENT DOCUMENTS

CN      102117459 A     7/2011
CN      105550927 A     5/2016
(Continued)

OTHER PUBLICATIONS

International Search Report of International Application No. PCT/CN2019/090737 dated Sep. 11, 2019.
(Continued)

*Primary Examiner* — Sarah Su
(74) *Attorney, Agent, or Firm* — Finnegan, Henderson, Farabow, Garrett & Dunner, LLP

(57) ABSTRACT

A risk control method includes: acquiring risk information of a current user operation; calculating, for an identity verification mode corresponding to historical identity verification, a security coefficient according to the risk information and security information corresponding to the identity verification mode, and calculating an estimated operation risk according to the security coefficient and an amount corresponding to the user operation; and performing prescribed risk control processing on the user operation when the estimated operation risk satisfies a preset condition, and waiving performing prescribed risk control processing on the user operation when the estimated operation risk does not satisfy the preset condition.

17 Claims, 6 Drawing Sheets

(56) References Cited

U.S. PATENT DOCUMENTS

| | | | | |
|---|---|---|---|---|
| 9,800,606 | B1* | 10/2017 | Yumer | G06F 21/577 |
| 10,375,104 | B1* | 8/2019 | Wu | H04L 63/1416 |
| 2015/0373015 | A1* | 12/2015 | Mary | G06F 21/44 |
| | | | | 726/9 |
| 2016/0330222 | A1* | 11/2016 | Brandt | H04L 67/22 |
| 2017/0004573 | A1* | 1/2017 | Hussain | G06Q 20/14 |
| 2017/0228635 | A1 | 8/2017 | Diev et al. | |
| 2017/0230418 | A1* | 8/2017 | Amar | H04L 63/08 |
| 2017/0236078 | A1* | 8/2017 | Rasumov | G06F 21/6218 |
| | | | | 705/7.28 |
| 2018/0234464 | A1* | 8/2018 | Sim | H04L 9/3213 |
| 2018/0248863 | A1* | 8/2018 | Kao | H04W 12/06 |
| 2020/0074070 | A1* | 3/2020 | Boodaei | G06F 21/33 |
| 2020/0097662 | A1* | 3/2020 | Hufsmith | H04L 67/10 |

FOREIGN PATENT DOCUMENTS

| | | |
|---|---|---|
| CN | 105791335 A | 7/2016 |
| CN | 107679856 A | 2/2018 |
| CN | 107749844 A | 3/2018 |
| CN | 107844977 A | 3/2018 |
| CN | 107977787 A | 5/2018 |
| CN | 108257022 A | 7/2018 |

OTHER PUBLICATIONS

Written Opinion of the International Searching Authority issued in International Application No. PCT/CN2019/090737, dated Sep. 11, 2019.

* cited by examiner

RISK CONTROL METHOD, RISK CONTROL APPARATUS, ELECTRONIC DEVICE, AND STORAGE MEDIUM

CROSS-REFERENCE TO RELATED APPLICATIONS

This application is a continuation application of International Application No. PCT/CN2019/090737, filed on Jun. 11, 2019, which is based upon and claims priority to Chinese Patent Application No. 201810755331.4, filed on Jul. 11, 2018, the entire content of all of which is incorporated herein by reference.

TECHNICAL FIELD

The present application relates generally to the technical field of risk control, and more particularly, to a risk control method, a risk control apparatus, an electronic device, and a storage medium.

BACKGROUND

In order to improve security of user operations, user operations with high risks are captured in existing risk control systems, and prescribed risk control processing such as user identity verification is performed on such user operations. Only users who pass the identity verification are allowed to continue transactions. As user operations with low risks are allowed, insecure transactions are avoided.

SUMMARY

According to a first aspect of embodiments of the specification, a risk control method includes: acquiring risk information of a current user operation, the risk information including at least one of a risk type or a parameter characterizing the magnitude of a risk corresponding to the risk type; calculating, for an identity verification mode corresponding to historical identity verification, a security coefficient according to the risk information and security information corresponding to the identity verification mode, wherein the historical identity verification includes identity verification for a current user prior to the user operation, and the security information is information related to the security of the identity verification mode; calculating an estimated operation risk according to the security coefficient and an amount corresponding to the user operation; and performing prescribed risk control processing on the user operation when the estimated operation risk satisfies a preset condition, and waiving performing prescribed risk control processing on the user operation when the estimated operation risk does not satisfy the preset condition.

According to a second aspect of embodiments of the present specification, a risk control apparatus includes: a processor; and a memory storing instructions executable by the processor, wherein the processor is configured to: acquire risk information of a current user operation, the risk information including at least one of a risk type or a parameter characterizing a magnitude of a risk corresponding to the risk type; calculate, for an identity verification mode corresponding to historical identity verification, a security coefficient according to the risk information and security information corresponding to the identity verification mode, wherein the historical identity verification includes identity verification for a current user prior to the user operation, and the security information is information related to the security of the identity verification mode; calculate an estimated operation risk according to the security coefficient and an amount corresponding to the user operation; and perform prescribed risk control processing on the user operation when the estimated operation risk satisfies a preset condition, and waive performing prescribed risk control processing on the user operation when the estimated operation risk does not satisfy the preset condition.

According to a third aspect of embodiments of the present specification, a non-transitory computer-readable storage medium has stored therein instructions that, when executed by a processor of a device, cause the device to perform the risk control method according to the first aspect.

The beneficial effects of the embodiments of the present specification are as follows: an estimated operation risk can be accurately calculated, risk control processing can be flexibly implemented for different users and risks, interruptions to users caused by risk control processing can be reduced while improving the security of user operations, and user experience can be improved.

BRIEF DESCRIPTION OF THE DRAWINGS

The accompanying drawings, which are incorporated in and constitute a part of the specification, illustrate embodiments consistent with the specification and, together with the description, serve to explain the principles of the specification.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the specification. Instead, they are merely examples of apparatuses and methods consistent with aspects related to the specification as recited in the appended claims.

In the embodiments of the specification, the term "and/or" includes any and all combinations of one or more of the associated listed terms. In addition, the term "according to" should be understood as "according at least in part to . . . " and the term "based on" should be understood as "based at least in part on . . . " unless the context clearly indicates otherwise.

Various implementations of the embodiments of the specification are described below with reference to the drawings. These implementations are only examples of, not limitations to, the embodiments of the specification.

In the existing technologies noted in the Background, differences between different users and differences in risks of different user operations are generally not considered. The risk grading for the user operations may be relatively rough, and defense schemes against risks are relatively simple and inflexible. Therefore, if the standard for identity verification is set to be strict, that is, more user operations are judged as high-risk operations, users will be frequently asked for identity verification; otherwise, if the standard for identity verification is set to be loose, the security of user operations is reduced.

Embodiments of the present specification provide a risk control method, a risk control apparatus, a risk control system, an electronic device, and a storage medium, which can accurately calculate an expected asset loss, flexibly implement risk control processing for different users and risks, reduce interruptions to users caused by risk control processing while improving the security of user operations, and improve user experience.

Figure 1:
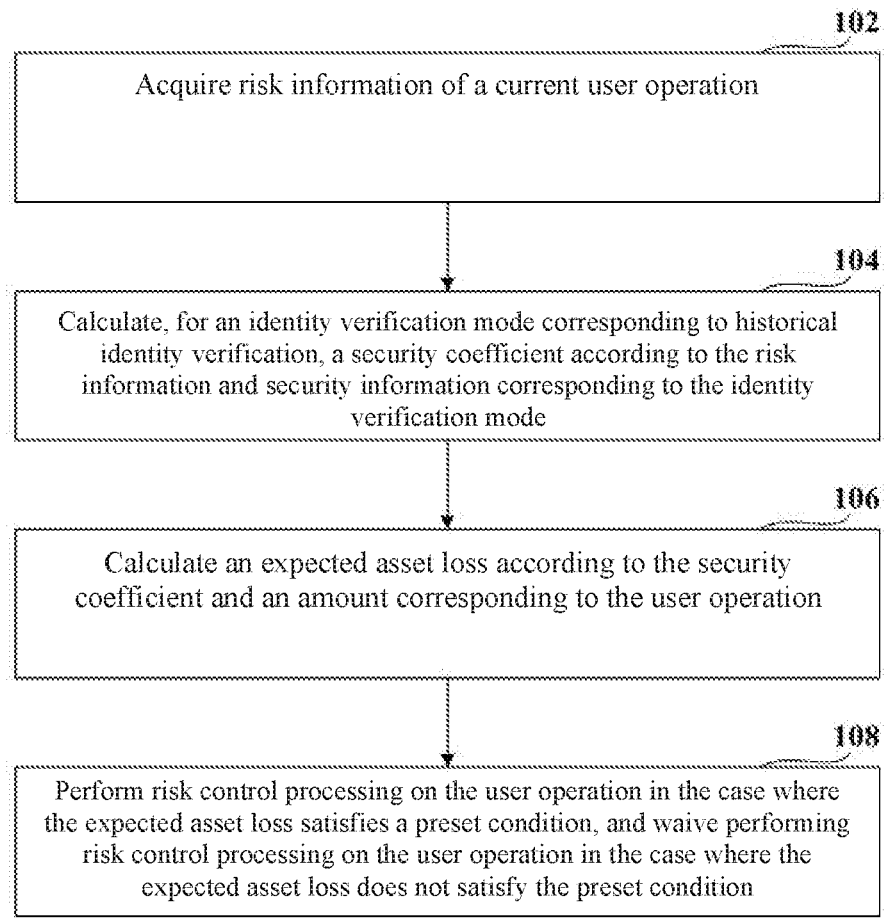
FIG. 1 is a flow chart of a risk control method according to an embodiment.

FIG. 1 is a flow chart of a risk control method according to an embodiment. As shown in FIG. 1, the risk control method includes the following steps.

In step 102, risk information of a current user operation is acquired, the risk information including a risk type and/or a parameter characterizing a magnitude of a risk corresponding to the risk type.

In step 104, for an identity verification mode corresponding to historical identity verification, a security coefficient is calculated according to the risk information and security information corresponding to the identity verification mode. For example, the historical identity verification includes identity verification for a current user prior to the user operation, and the security information is information related to the security of the identity verification mode.

In step 106, an estimated operation risk, which may be an expected asset loss and referred here after as the expected asset loss, is calculated according to the security coefficient and an amount corresponding to the user operation.

In step 108, prescribed risk control processing is performed on the user operation in the case where the expected asset loss satisfies a preset condition, and prescribed risk control processing is waived on the user operation in the case where the expected asset loss does not satisfy the preset condition.

In the embodiment, by calculating the security coefficient according to the risk information and the security information of the current user operation and using the security coefficient for calculating the estimated operation risk, e.g., the expected asset loss, the expected asset loss can be accurately calculated. Therefore, it can be accurately determined whether prescribed risk control processing is performed, so that risk control processing can be flexibly implemented for different users and risks, interruptions to users caused by risk control processing can be reduced while improving the security of user operations, and user experience can be improved.

Moreover, since the security coefficient is calculated for an identity verification mode, the security can be improved for various identity verification modes and the interruptions can be reduced. Thus, the security can be improved and the interruptions can be reduced in a scenario of various user identity verification modes.

In an embodiment, a user operation may be an operation for a certain amount of resource, such as money, asset, etc. For example, it may be a transaction operation between a user and a merchant, or it may be an asset transfer operation of a user. The asset transfer operation may be, for example, a transfer operation.

In an embodiment, the risk type may include, for example, a risk of device loss, a remote risk for a personal computer, a risk of secondary number allocation, a risk of conventional theft, etc. The risk of conventional theft characterizes a risk of the theft of an operating account other than the device loss, but the embodiment is not limited thereto and may include other risk types that can be identified. In addition, the parameter characterizing the magnitude of the risk corresponding to the risk type may be, for example, a risk score corresponding to the risk type, and the score may be, for example, a value between 0-1, which is used to characterize the corresponding risk magnitude. However, the embodiment is not limited thereto, and the score may also use other numerical ranges. Moreover, the risk score may not be used as the parameter, but a risk grade may be used as the parameter.

In an embodiment, in addition to the risk type and/or the above parameter, the risk information may also include other information related to the risk, for example, indicating a risk weight corresponding to the risk type, etc. In some embodiments, the risk information in the embodiment may be identified using existing risk identification strategies.

In an embodiment, the identity verification mode includes, for example, a manual verification mode, a face verification mode, a privacy verification mode, etc. The privacy verification may be, for example, security inquiry verification, identification (ID) card number verification, bank card verification, etc. However, the embodiment is not limited thereto, and may also include other modes capable of achieving identity verification.

In an embodiment, the security information is security-related information corresponding to an identity verification mode. For example, the security information may include at least one of: an identifier of a device used for identity verification corresponding to the identity verification mode, an execution environment of identity verification corresponding to the identity verification mode, an execution time of identity verification corresponding to the identity verification mode, a result of identity verification corresponding to the identity verification mode, and a frequency or number of identity verification corresponding to the identity verification mode. However, the embodiment is not limited thereto, and the security information may also include other information.

In an embodiment, the identifier of a device may be, for example, an identification code and/or an address of the device. The identification code of the device may be, for example, a Unique Material Identifier (UMID) of the device. The address of the device may be, for example, a hardware address or an Internet address. The execution environment of identity verification may be, for example, the Internet, a wireless local area network, a Location Based Service (LBS), etc. The result of identity verification may be, for example, that the identity verification is successful or not. However, the present embodiment is not limited thereto, and other device identifiers and operating environments may also be adopted.

In an embodiment, the prescribed risk control processing is to reduce risks, for example, including: not allowing the user operation, restricting the authority for the user operation, and requiring the user to verify the identity, etc., but the embodiment is not limited thereto. Other risk control processing modes may also be included. The risk control processing may be prescribed according to an actual situation. Waiving performing the risk control processing is that the user operation is directly allowed.

In an embodiment, in step 104, each piece of specific information in the above risk information and security information may be quantified as a numerical value, corresponding weights are assigned to these different pieces of specific information, and the weighted pieces of information are combined according to a predetermined rule for calculating the security coefficient. Specific quantification modes and rules may be determined according to actual needs. For example, the security coefficient may be calculated using the Delphi method.

In an embodiment, the risk type is a conventional theft risk, the risk magnitude is 0.4, the security information includes: identity verification is performed within 24 hours, face identification verification is performed once under the same device, and the verification result is that the verification is passed. Accordingly, the security coefficient may be calculated according to the above information and the Delphi method. For example, it is calculated as 0.95 when a highest value of the security coefficient is 1.

In embodiments of the specification, the above historical identity verification may correspond to one or at least two identity verification modes.

In an embodiment, the historical identity verification corresponds to one identity verification mode. Accordingly, for the identity verification mode, a security coefficient corresponding to the identity verification mode is calculated according to the risk information and security information corresponding to the identity authentication mode.

Figure 2:
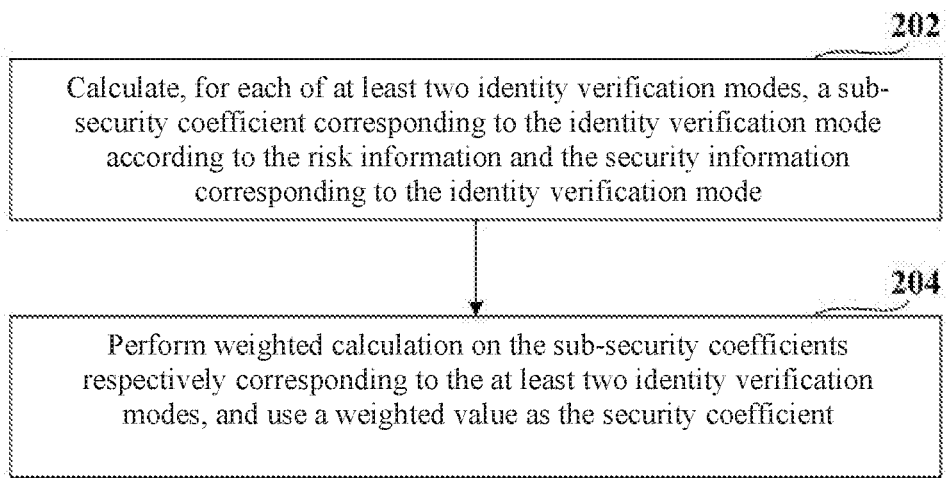
FIG. 2 is a flow chart of an implementation method for step 104 in the risk control method of FIG. 1 according to an embodiment.

FIG. 2 is a flow chart of an implementation method for step 104 according to an embodiment. As shown in FIG. 2, in the case where the historical identity verification corresponds to at least two identity verification modes, step 104 may include the following steps.

In step 202, for each of the at least two identity verification modes, a sub-security coefficient corresponding to the identity verification mode is calculated according to the risk information and the security information corresponding to the identity verification mode.

In step 204, weighted calculation is performed on the sub-security coefficients respectively corresponding to the at least two identity verification modes, and a weighted value is used as the security coefficient.

Referring back to FIG. 1, in step 106, the expected asset loss may be calculated according to the security coefficient and the amount corresponding to the user operation in accordance with a preset rule. The expected asset loss may characterize a potential asset loss.

In an embodiment, step 106 may, for example, calculate the expected asset loss according to the following formula (1):

$$\text{Expected asset loss} = \text{amount corresponding to user operation} \times (1 - \text{security coefficient}) \quad (1)$$

The value of the security coefficient is limited to vary in a range of 0 to 1. However, the embodiment is not limited thereto, and the range of values of the security coefficient may also be limited to other ranges. The limitation of the value range of the security coefficient may be achieved by adjusting specific rules used when calculating the security coefficient.

However, the embodiment is not limited to calculating the expected asset loss using the above formula (1), and other suitable formulas may also be used for calculation.

Figure 3:
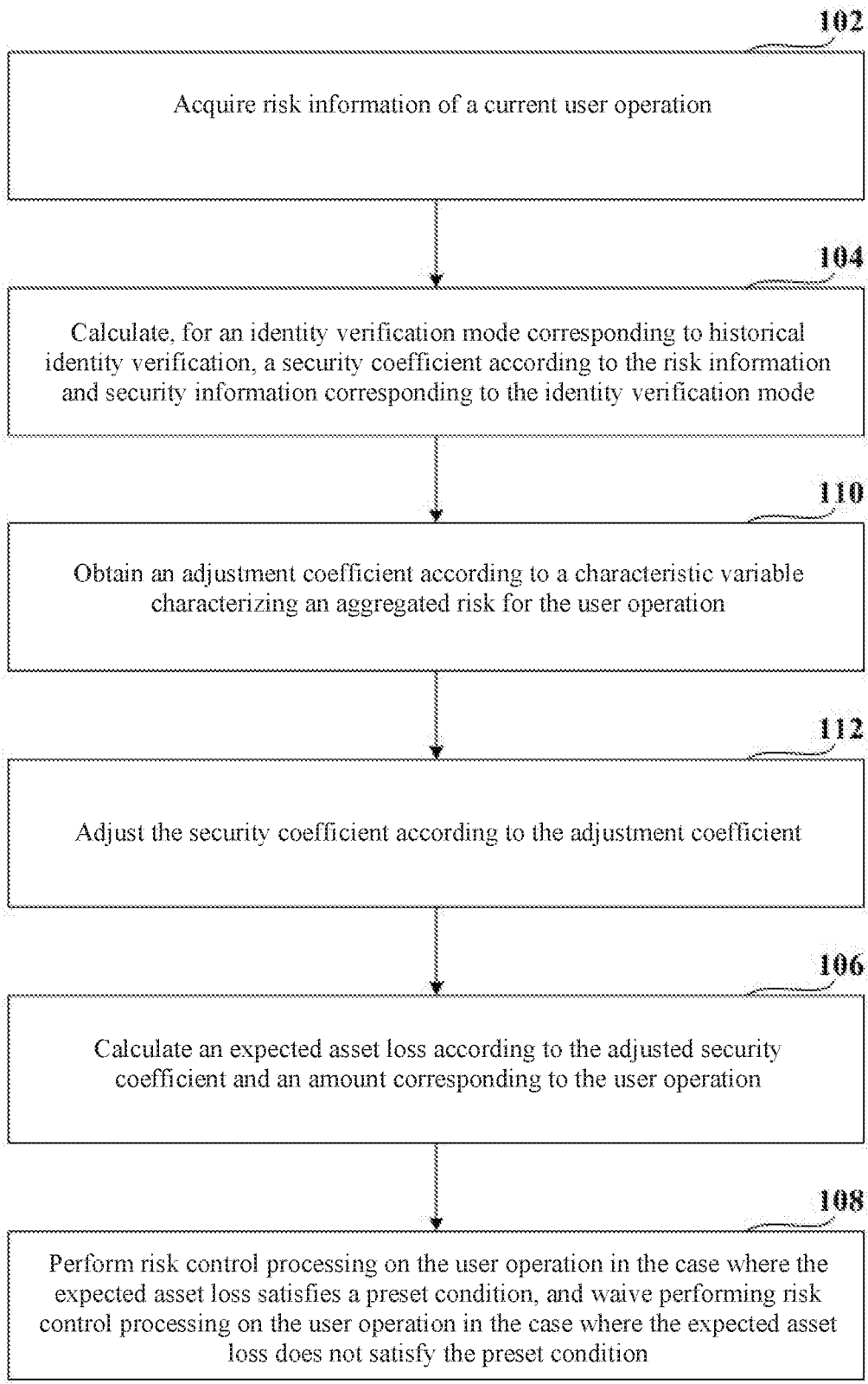
FIG. 3 is a flow chart of a risk control method according to another embodiment.

FIG. 3 is a flow chart of the risk control method according to another embodiment. As shown in FIG. 3, the risk control method may further include the following steps.

In step 110, an adjustment coefficient is obtained according to a characteristic variable characterizing an aggregated risk for the user operation.

In step 112, the security coefficient is adjusted according to the adjustment coefficient.

Accordingly, in step 106, the expected asset loss may be calculated according to the adjusted security coefficient and the amount corresponding to the user operation. Therefore, the impact of an aggregated risk can be reflected in the calculated expected asset loss, so that the expected asset loss can be calculated more accurately, and the risk control can quickly respond to the aggregated risk. For example, the aggregated risk may be, for example, a batch attack risk, but the embodiment is not limited thereto. The aggregated risk may also be other types of aggregated risk.

In FIG. 3, step 110 is performed after step 104, but the embodiment is not limited thereto. Step 110 may also be performed before step 104, or may be performed in parallel with step 104.

In an embodiment, step 112 may include: using a value obtained by multiplying the adjustment coefficient and the security coefficient as the adjusted security coefficient.

In an embodiment, step 106 may calculate the expected asset loss according to the following formula (2):

$$\text{Expected asset loss} = \text{amount corresponding to user operation} \times (1 - \text{adjusted security coefficient}) \quad (2)$$

Figure 4:
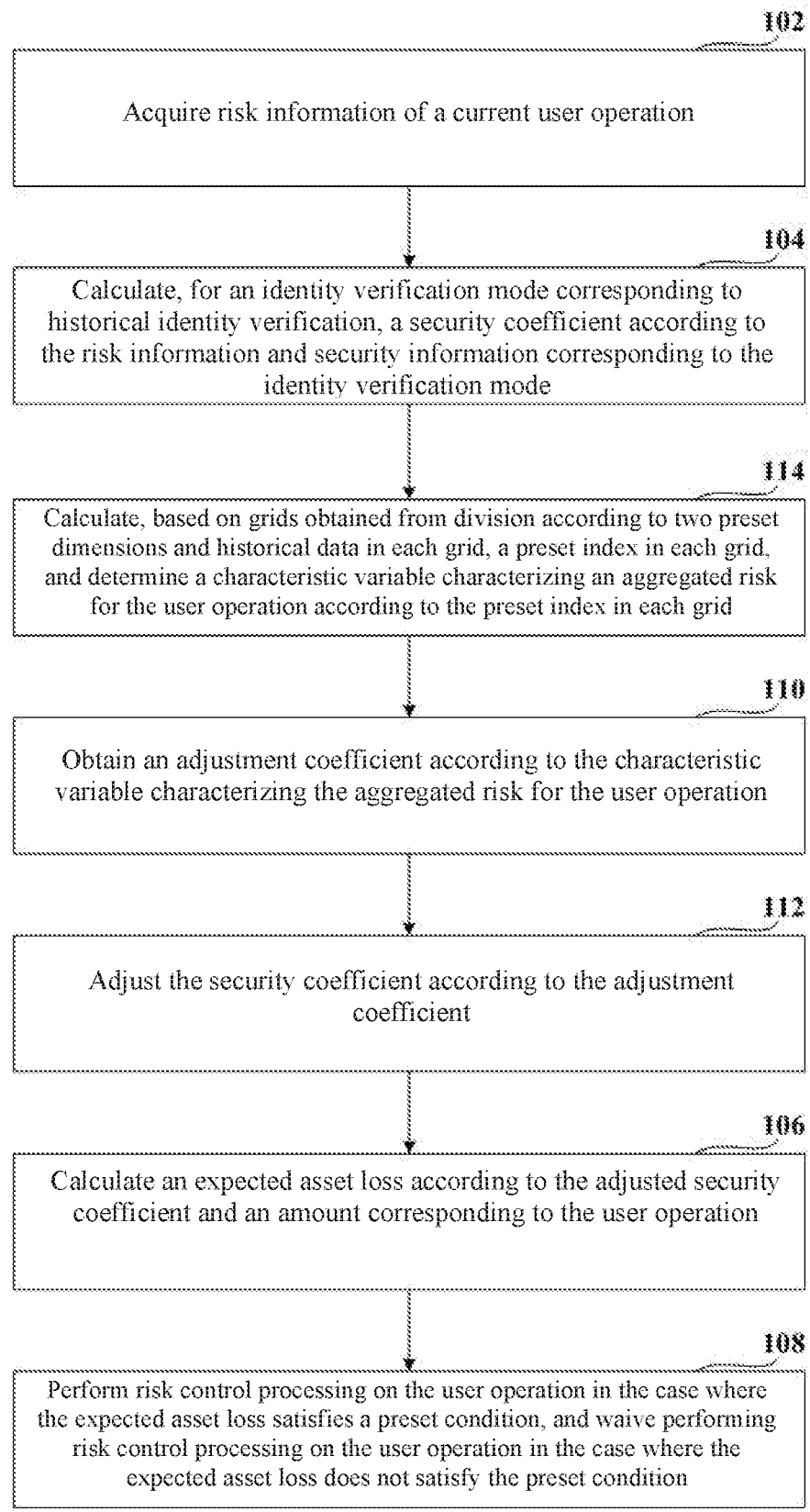
FIG. 4 is a flow chart of a risk control method according to another embodiment.

FIG. 4 is a flow chart of the risk control method according to another embodiment. As shown in FIG. 4, before step 110, the risk control method may further include the following step.

In step 114, based on grids obtained from division according to two preset dimensions and historical data in each grid, a preset index in each grid is calculated, and a characteristic variable is determined according to the preset index in each grid. The historical data is data, related to a user operation prior to the current user operation, in the grid.

For example, the two preset dimensions are a first dimension and a second dimension corresponding to the current user operation. The first dimension may be, for example, a merchant or an Internet address corresponding to the current user operation, and the second dimension may be, for example, the time, environment or region, etc. of the current user operation. The preset index may be, for example, an event audit rate indicating a hit rate of a risk identification strategy, a verification failure rate indicating a failure rate of identity verification, a proportion of trusted operations indicating a proportion of the number of user operations performed in a trusted environment and/or a trusted device to the total number of user operations, or an incidence of cases within a prescribed number of days (for example, 30 days). However, the embodiment is not limited thereto. The preset index may also be other indexes. The historical data may be any data related to a user operation before the current user operation and used to calculate the preset index.

In FIG. 4, step 114 is performed after step 104, but the embodiment is not limited thereto. Step 114 may also be performed before step 104, or may be performed in parallel with step 104.

In embodiments of the specification, there may be one or at least two characteristic variables.

In an embodiment, there is only one characteristic variable. Accordingly, the adjustment coefficient is obtained according to the characteristic variable.

In an embodiment, there are at least two characteristic variables. Accordingly, the risk control method may further include a step (not shown): performing weighted calculation on the at least two characteristic variables to obtain a weighted value of the characteristic variables.

Accordingly, step 110 may include: obtaining the adjustment coefficient according to the weighted value of the characteristic variables.

In an embodiment, step 108 may include: performing prescribed risk control processing on the user operation in the case, e.g., in response to, where the expected asset loss exceeds a threshold, and waiving performing prescribed risk control processing on the user operation in the case, e.g., in response to, where the expected asset loss does not exceed the threshold. That is, the preset condition in step 108 is that the threshold is exceeded. In addition, other preset conditions may also be set according to actual needs.

In an embodiment, in the case where the expected asset loss exceeds a threshold, performing prescribed risk control processing on the user operation may further include: performing prescribed first risk control processing on the user operation in the case where the expected asset loss exceeds the above threshold and does not exceed another threshold; and performing prescribed second risk control processing on the user operation in the case where the expected asset loss exceeds the another threshold. The step is an optional step.

Before step 108, the risk control method may further include a step (not shown): setting the threshold according to the risk information and the amount corresponding to the user operation. Therefore, the threshold may be set more reasonably corresponding to the calculation of the expected asset loss.

Figure 5:
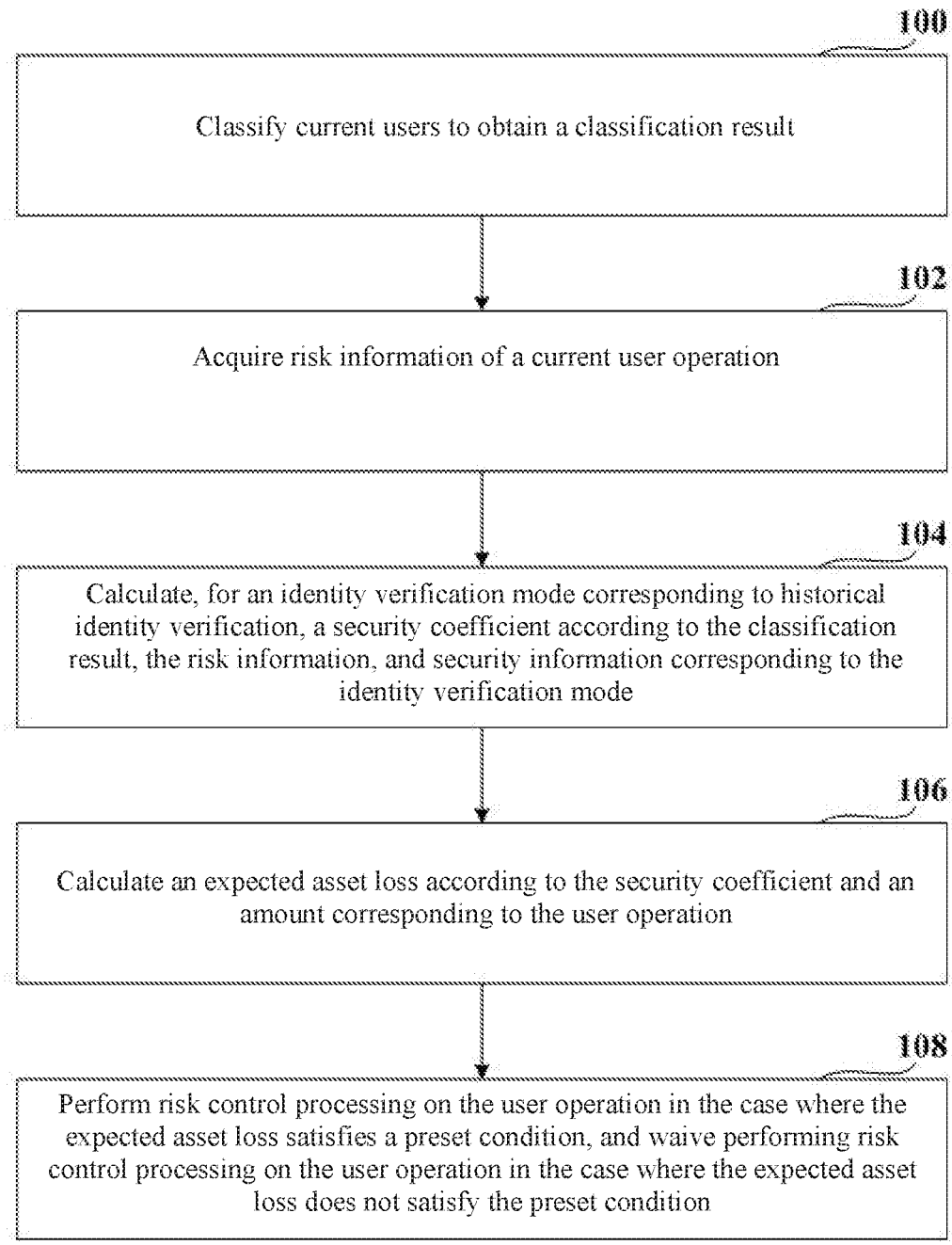
FIG. 5 is a flow chart of a risk control method according to another embodiment.

FIG. 5 is a flow chart of the risk control method according to another embodiment. As shown in FIG. 5, before step 104, the risk control method may further include the following step.

In step 100, users are classified to obtain a classification result.

Accordingly, step 104 may include: calculating the security coefficient according to the classification result, the risk information, and the security information. Therefore, the impact of user classification can be further reflected in the calculated expected asset loss, so that the expected asset loss can be calculated more accurately.

In FIG. 5, step 100 is performed before step 102, but the embodiment is not limited thereto. Step 100 may also be performed after step 102 and before step 104, or may be performed in parallel with step 102.

In an embodiment, current users may be classified according to at least one of the following information: user consumption behaviors, social attributes of users, information about devices used by users, identity verification modes and results corresponding to historical identity verification, user complaints, user cases (such as fraud cases reported by users), and user security awareness. However, the embodiment is not limited thereto, and users may be classified according to other information related to the users.

In an embodiment, a classification rule may, for example, consider factors such as the gullibility of users and/or the disturbance sensitivity of users. Therefore, the classification results may correspondingly be gullible users and disturbance sensitive users. For example, for gullible users, if other conditions are the same, in step 104, the security coefficient is lower; for disturbance sensitive users, if other conditions are the same, in step 104, the security coefficient is higher. However, the embodiment is not limited thereto, and other factors that can affect the security coefficient may also be considered to classify users.

In the method shown in FIG. 5, if the preset condition is set to be exceeding a threshold, the threshold may be set according to the classification result, the risk information, and the amount corresponding to the user operation. Therefore, the threshold may be set more reasonably corresponding to the calculation mode of the expected asset loss.

By the risk control method of the above embodiments, the expected asset loss can be accurately calculated, risk control processing can be flexibly implemented for different users and risks, interruptions to users caused by risk control processing can be reduced while improving the security of user operations, and user experience can be improved.

Figure 6:
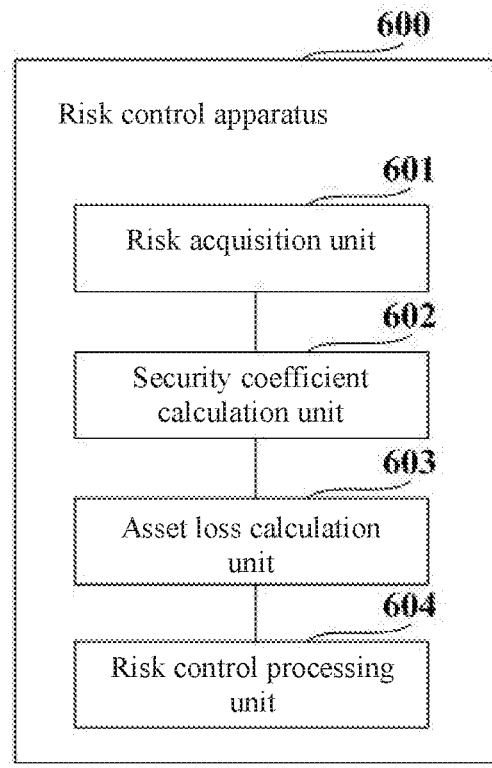
FIG. 6 is a schematic diagram of a risk control apparatus according to an embodiment.

FIG. 6 is a schematic diagram of a risk control apparatus 600 according to an embodiment. Risk control apparatus 600 is configured to perform the risk control method described above.

As shown in FIG. 6, risk control apparatus 600 includes a risk acquisition unit 601, a security coefficient calculation unit 602, an asset loss calculation unit 603, and a risk control processing unit 604.

Risk acquisition unit 601 acquires risk information of a current user operation, the risk information including a risk type and/or a parameter characterizing a magnitude of a risk corresponding to the risk type. Security coefficient calculation unit 602 calculates, for an identity verification mode corresponding to historical identity verification, a security coefficient according to the risk information and security information corresponding to the identity verification mode. For example, the historical identity verification includes identity verification for a current user prior to the user operation, and the security information is information related to the security of the identity verification mode. Asset loss calculation unit 603 calculates an expected asset loss according to the security coefficient and an amount corresponding to the user operation. Risk control processing unit 604 performs prescribed risk control processing on the user operation in the case where the expected asset loss satisfies a preset condition, and waives performing prescribed risk control processing on the user operation in the case where the expected asset loss does not satisfy the preset condition.

In an embodiment, the historical identity verification corresponds to one identity verification mode. Accordingly, security coefficient calculation unit 602 may calculate a security coefficient corresponding to the identity verification mode according to the risk information and the security information for the identity verification mode.

In an embodiment, the historical identity verification corresponds to at least two identity verification modes. Accordingly, security coefficient calculation unit 602 may calculate, for each of the at least two identity verification modes, a sub-security coefficient corresponding to the identity verification mode according to the risk information and security information corresponding to the identity verification mode, perform weighted calculation on the sub-security coefficients respectively corresponding to the at least two identity verification modes, and use a weighted value as the security coefficient.

Figure 7:
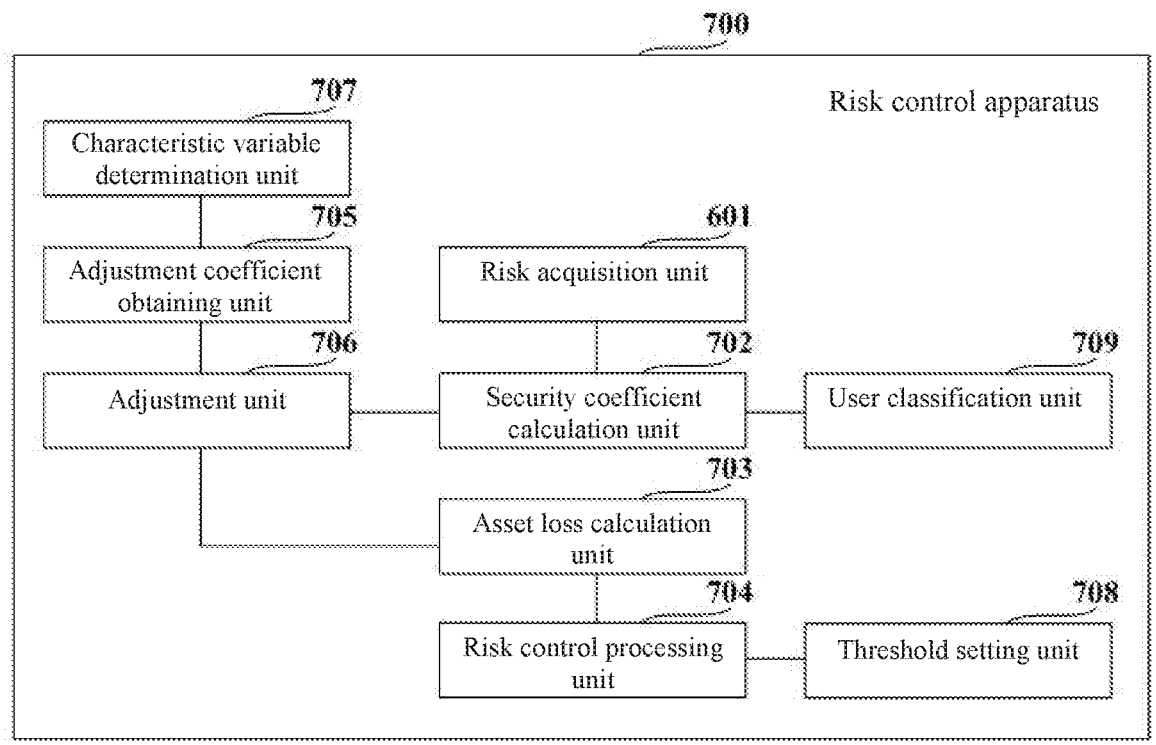
FIG. 7 is a schematic diagram of a risk control apparatus according to another embodiment.

FIG. 7 is a schematic diagram of a risk control apparatus 700 according to another embodiment. As shown in FIG. 7, risk control unit 700 includes a risk acquisition unit 601, a security coefficient calculation unit 702, an asset loss calculation unit 703, and a risk control processing unit 704.

Risk acquisition unit 601 is as described above and will not be repeated here. Security coefficient calculation unit 702, asset loss calculation unit 703, and risk control processing unit 704 can respectively implement the functions implemented by security coefficient calculation unit 602, asset loss calculation unit 603, and risk control processing unit 604.

In an embodiment, as shown in FIG. 7, risk control unit 700 may further include an adjustment coefficient obtaining unit 705 and an adjustment unit 706. Adjustment coefficient obtaining unit 705 may obtain an adjustment coefficient according to a characteristic variable characterizing an aggregated risk for the user operation. Adjustment unit 706 may adjust the security coefficient according to the adjustment coefficient. Asset loss calculation unit 703 may calculate the expected asset loss according to the adjusted security coefficient and the amount corresponding to the user operation.

In an embodiment, as shown in FIG. 7, risk control apparatus 700 may further include a characteristic variable determination unit 707. Characteristic variable determination unit 707 may calculate, based on grids obtained from division according to two preset dimensions and historical data in each grid, a preset index in each grid, and determine the characteristic variable according to the preset index in each grid. The historical data is data, related to a user operation prior to the current user operation, in the grid.

In an embodiment, as shown in FIG. 7, in the case where there are at least two characteristic variables, characteristic variable calculation unit 707 may further perform weighted calculation on the at least two characteristic variables to obtain a weighted value of the characteristic variables, and adjustment coefficient obtaining unit 705 may obtain the adjustment coefficient according to the weighted value of the characteristic variables.

In an embodiment, risk control processing unit 704 may perform prescribed risk control processing on the user operation in the case where the expected asset loss exceeds a threshold, and may waive performing prescribed risk control processing on the user operation in the case where the expected asset loss does not exceed the threshold.

In an embodiment, as shown in FIG. 7, risk control apparatus 700 may further include a threshold setting unit 708 that sets the above threshold according to the risk information and the amount corresponding to the user operation.

In an embodiment, as shown in FIG. 7, risk control apparatus 700 may further include a user classification unit 709. User classification unit 709 may classify users to obtain a classification result, and security coefficient calculation unit 702 may calculate the security coefficient according to the classification result, the risk information, and the security information.

For specific implementations of the functions of the above units, reference may be made to the method embodiments described above.

By the above risk control apparatus, an expected asset loss can be accurately calculated, risk control processing can be flexibly implemented for different users and risks, interruptions to users caused by risk control processing can be reduced while guaranteeing the security of user operations, and user experience can be improved.

In an embodiment, there is provided a computer-readable program that causes a processor to perform the methods described above.

In an embodiment, there is provided a non-transitory storage medium storing instructions that, when executed by a processor of a device, cause the device to perform the methods described above.

Figure 8:
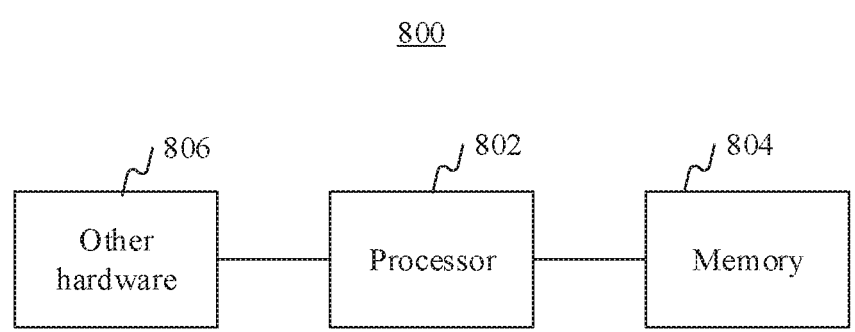
FIG. 8 is a schematic diagram of a risk control apparatus according to another embodiment.

FIG. 8 is a schematic diagram of a risk control apparatus 800 according to another embodiment. For example, the risk control apparatus 800 includes at least one processor 802; and a memory 804 communicatively connected to processor 802. Risk control apparatus 800 may also include other hardware 806, such as a network interface, a display, etc. Processor 802 may include one or more dedicated processing units, application-specific integrated circuits (ASICs), field-programmable gate arrays (FPGAs), or various other types of processors or processing units. Processor 802 is coupled with memory 804 and is configured to execute instructions stored in memory 804 to perform the above described methods. Memory 804 may include a non-permanent memory, a random access memory (RAM) and/or a non-volatile memory (such as a read-only memory (ROM) or a flash memory (flash RAM)), etc.

Risk control apparatus 800 may be any type of electronic devices. The electronic device may be, for example, a terminal device on a user side, or a server device on a network side, or may be implemented in cooperation between the terminal device and the server device. The server device may be a server device or a server device cluster composed of a plurality of server devices. That is to say, the processor and the memory of the electronic device in the embodiment may be a processor and a memory provided in one device, or may be processors and memories provided in a plurality of devices in a distributed manner.

Each unit in the risk control apparatus described above in FIG. 6 may be implemented as hardware, a software module executed by a processor, or a combination of both. For example, one or more of the units shown in FIG. 6 may correspond to a software module of a computer program flow or a hardware module. These software modules may respectively correspond to the various steps shown in FIG. 1. These hardware modules may be implemented by, for example, changing these software modules into firmware using a field programmable gate array (FPGA).

The software modules may be located in a RAM, a flash memory, a ROM, an EPROM, an EEPROM, a register, a hard disk, a removable disk, a CD-ROM, or any other forms of storage medium known in the art. A storage medium may be coupled to the processor, so that the processor can read information from the storage medium and write information to the storage medium. Or the storage medium may be a component of the processor. The processor and the storage medium may be located in an application-specific integrated circuit (ASIC). The software modules may be stored in the memory of the electronic device, or may be stored in a memory card that can be inserted into the electronic device. For example, if the electronic device adopts a larger-capacity MEGA-SIM card or a large-capacity flash memory device, the software modules may be stored in the MEGA-SIM card or the large-capacity flash memory device.

One or more of the functional block diagrams described in the drawings and/or one or more combinations of the functional block diagrams may be implemented as a general-purpose processor, a digital signal processor (DSP), an ASIC, an FPGA or other programmable logic devices, discrete gates or transistor logic devices, discrete hardware components, or any suitable combination thereof for performing the functions described in the present application. One or more of the functional block diagrams described in the drawings and/or one or more combinations of the functional block diagrams may also be implemented as a combination of computing devices, for example, a combination of a DSP and a microprocessor, a plurality of microprocessors, one or more microprocessors combined with the DSP communicatively, or any other such configuration.

Other implementations of the embodiments will be apparent to those skilled in the art from consideration of the specification. This application is intended to cover any variations, uses, or adaptations of the specification following the general principles thereof and including such departures from the specification as come within known or customary practice in the art. It is intended that the embodiments be considered examples only, with a true scope and spirit of the specification being indicated by the following claims.

It will be appreciated that the specification is not limited to the exact construction that has been described above and illustrated in the accompanying drawings, and that various modifications and changes may be made without departing from the scope thereof. It is intended that the scope of the specification only be limited by the appended claims.

The invention claimed is:

1. A risk control method, comprising:
    acquiring risk information of a user operation, the risk information comprising at least one of a risk type or a parameter characterizing a magnitude of a risk corresponding to the risk type;
    calculating, for an identity verification mode corresponding to historical identity verification, a security coefficient according to the risk information and security information corresponding to the identity verification mode, wherein the historical identity verification comprises identity verification for a current user prior to the user operation, and the security information is information related to security of the identity verification mode;
    calculating an estimated operation risk according to the security coefficient and an amount of resource corresponding to the user operation; and
    performing prescribed risk control processing on the user operation when the estimated operation risk satisfies a preset condition, and waiving performing prescribed risk control processing on the user operation when the estimated operation risk does not satisfy the preset condition.

2. The risk control method according to claim 1, wherein when the historical identity verification corresponds to at least two identity verification modes, calculating the security coefficient according to the risk information and the security information corresponding to the identity verification mode comprises:
    calculating, for each of the at least two identity verification modes, a sub-security coefficient corresponding to the identity verification mode according to the risk information and security information corresponding to the identity verification mode; and
    performing weighted calculation on the sub-security coefficients respectively corresponding to the at least two identity verification modes, to obtain a weighted value as the security coefficient.

3. The risk control method according to claim 1, further comprising:
    obtaining an adjustment coefficient according to a characteristic variable characterizing an aggregated risk for the user operation;
    adjusting the security coefficient according to the adjustment coefficient; and
    calculating the estimated operation risk according to the adjusted security coefficient and the amount of resource corresponding to the user operation.

4. The risk control method according to claim 3, before obtaining the adjustment coefficient according to the characteristic variable characterizing the aggregated risk for the user operation, the risk control method further comprising:
    calculating, based on grids obtained from division according to two preset dimensions and historical data in each grid, a preset index in each grid, and determining the characteristic variable according to the preset index in each grid, wherein the historical data is data, related to another user operation prior to the user operation, in the grid.

5. The risk control method according to claim 3, wherein obtaining the adjustment coefficient according to the characteristic variable characterizing the aggregated risk for the user operation comprises:
    performing weighted calculation on at least two characteristic variables to obtain a weighted value of the characteristic variables; and
    obtaining the adjustment coefficient according to the weighted value of the characteristic variables.

6. The risk control method according to claim 1, wherein performing the prescribed risk control processing on the user operation when the estimated operation risk satisfies the preset condition and waiving performing the prescribed risk control processing on the user operation when the estimated operation risk does not satisfy the preset condition comprises:
    performing the prescribed risk control processing on the user operation when the estimated operation risk exceeds a threshold, and waiving performing the prescribed risk control processing on the user operation when the estimated operation risk does not exceed the threshold.

7. The risk control method according to claim 6, further comprising:
    setting the threshold according to the risk information and the amount of resource corresponding to the user operation.

8. The risk control method according to claim 1, further comprising:
    classifying users to obtain a classification result,
    wherein calculating the security coefficient according to the risk information and the security information corresponding to the identity verification mode comprises:
    calculating, for the identity verification mode corresponding to the historical identity verification, the security coefficient according to the classification result, the risk information, and the security information corresponding to the identity verification mode.

9. A risk control apparatus, comprising:
    a processor; and
    a memory storing instructions executable by the processor,
    wherein the processor is configured to:
    acquire risk information of a current user operation, the risk information comprising at least one of a risk type or a parameter characterizing a magnitude of a risk corresponding to the risk type;
    calculate, for an identity verification mode corresponding to historical identity verification, a security coefficient according to the risk information and security information corresponding to the identity verification mode, wherein the historical identity verification comprises identity verification for a current user prior to the user operation, and the security information is information related to the security of the identity verification mode;

calculate an estimated operation risk according to the security coefficient and an amount of resource corresponding to the user operation; and perform prescribed risk control processing on the user operation when the estimated operation risk satisfies a preset condition, and waive performing prescribed risk control processing on the user operation when the estimated operation risk does not satisfy the preset condition.

10. The risk control apparatus according to claim 9, wherein when the historical identity verification corresponds to at least two identity verification modes, the processor is further configured to:

calculate, for each of the at least two identity verification modes, a sub-security coefficient corresponding to the identity verification mode according to the risk information and security information corresponding to the identity verification mode; and perform weighted calculation on the sub-security coefficients respectively corresponding to the at least two identity verification modes, to obtain a weighted value as the security coefficient.

11. The risk control apparatus according to claim 9, wherein the processor is further configured to:

obtain an adjustment coefficient according to a characteristic variable characterizing an aggregated risk for the user operation;

adjust the security coefficient according to the adjustment coefficient; and calculate the estimated operation risk according to the adjusted security coefficient and the amount of resource corresponding to the user operation.

12. The risk control apparatus according to claim 11, wherein the processor is further configured to:

calculate, based on grids obtained from division according to two preset dimensions and historical data in each grid, a preset index in each grid, and calculate the characteristic variable according to the preset index in each grid, wherein the historical data is data, related to another user operation prior to the user operation, in the grid.

13. The risk control apparatus according to claim 11, wherein the processor is further configured to:

perform weighted calculation on at least two characteristic variables to obtain a weighted value of the characteristic variables, and obtain the adjustment coefficient according to the weighted value of the characteristic variables.

14. The risk control apparatus according to claim 9, wherein the processor is further configured to:

perform the prescribed risk control processing on the user operation when the estimated operation risk exceeds a threshold, and waive performing the prescribed risk control processing on the user operation when the estimated operation risk does not exceed the threshold.

15. The risk control apparatus according to claim 9, wherein the processor is further configured to:

set the threshold according to the risk information and the amount of resource corresponding to the user operation.

16. The risk control apparatus according to claim 9, wherein the processor is further configured to:

classify users to obtain a classification result; and calculate, for the identity verification mode corresponding to the historical identity verification, the security coefficient according to the classification result, the risk information, and the security information corresponding to the identity verification mode.

17. A non-transitory computer-readable storage medium having stored therein instructions that, when executed by a processor of a device, cause the device to perform a risk control method, the method comprising:

acquiring risk information of a user operation, the risk information comprising at least one of a risk type or a parameter characterizing a magnitude of a risk corresponding to the risk type;

calculating, for an identity verification mode corresponding to historical identity verification, a security coefficient according to the risk information and security information corresponding to the identity verification mode, wherein the historical identity verification comprises identity verification for a current user prior to the user operation, and the security information is information related to security of the identity verification mode;

calculating an estimated operation risk according to the security coefficient and an amount of resource corresponding to the user operation; and performing prescribed risk control processing on the user operation when the estimated operation risk satisfies a preset condition, and waiving performing prescribed risk control processing on the user operation when the estimated operation risk does not satisfy the preset condition.

* * * * *

UNITED STATES PATENT AND TRADEMARK OFFICE
CERTIFICATE OF CORRECTION

| | |
|---|---|
| PATENT NO. | : 11,075,941 B2 |
| APPLICATION NO. | : 17/083946 |
| DATED | : July 27, 2021 |
| INVENTOR(S) | : Fanfan Ye |

Page 1 of 1

It is certified that error appears in the above-identified patent and that said Letters Patent is hereby corrected as shown below:

In the Claims

Claim 9, Column 12, Line 58, "acquire risk information of a current user operation" should read --acquire risk information of a user operation--.

Signed and Sealed this
Seventh Day of November, 2023

Katherine Kelly Vidal
*Director of the United States Patent and Trademark Office*